US008755738B2

(12) United States Patent
Forutanpour et al.

(10) Patent No.: US 8,755,738 B2
(45) Date of Patent: Jun. 17, 2014

(54) SYSTEMS AND METHODS FOR GENERATING A SELECTIVE DISTRIBUTION OF MEDIA CONTENT FEEDS

(75) Inventors: Babak Forutanpour, Carlsbad, CA (US); Lawrence T. Cleary, San Diego, CA (US); William C. Ater, San Diego, CA (US); Marc L. Sands, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 775 days.

(21) Appl. No.: 12/651,057

(22) Filed: Dec. 31, 2009

(65) Prior Publication Data
US 2011/0065376 A1 Mar. 17, 2011

Related U.S. Application Data

(60) Provisional application No. 61/241,865, filed on Sep. 11, 2009.

(51) Int. Cl.
*H04H 20/71* (2008.01)
*H04H 40/00* (2008.01)
*H04W 24/00* (2009.01)

(52) U.S. Cl.
USPC ...... 455/3.01; 455/3.06; 455/3.05; 455/456.1

(58) Field of Classification Search
USPC ................. 455/3.01, 3.06, 66.1, 344, 899
See application file for complete search history.

(56) References Cited

U.S. PATENT DOCUMENTS

| 8,219,134 | B2* | 7/2012 | Maharajh et al. | 455/519 |
|---|---|---|---|---|
| 8,275,313 | B1* | 9/2012 | Myers et al. | 455/41.2 |
| 2005/0228860 | A1 | 10/2005 | Hamynen et al. | |
| 2007/0161382 | A1 | 7/2007 | Melinger et al. | |
| 2008/0155453 | A1* | 6/2008 | Othmer | 715/774 |
| 2008/0200154 | A1* | 8/2008 | Maharajh et al. | 455/414.3 |
| 2008/0207137 | A1* | 8/2008 | Maharajh et al. | 455/74 |
| 2008/0207182 | A1* | 8/2008 | Maharajh et al. | 455/414.1 |
| 2009/0055742 | A1* | 2/2009 | Nordhagen | 715/716 |
| 2009/0094649 | A1* | 4/2009 | Patel | 725/86 |
| 2010/0240298 | A1* | 9/2010 | McKenna et al. | 455/3.05 |

FOREIGN PATENT DOCUMENTS

| CN | 101238740 A | 8/2008 |
|---|---|---|
| WO | WO2009005865 | 1/2009 |

OTHER PUBLICATIONS

International Search Report and Written Opinion—PCT/US2010/045069, International Search Authority—European Patent Office—Nov. 12, 2010.

* cited by examiner

*Primary Examiner* — Tilahun B Gesesse
(74) *Attorney, Agent, or Firm* — Fariba Yadegar-Bandari

(57) ABSTRACT

Aspects relate to systems and methods for generating a selective distribution of media content feeds. A content server can identify a set of mobile video cameras or other sources for delivery to a mobile device, based on a state of motion or orientation of the mobile device. Media content can be collected from video-equipped cellular devices capable of reporting their position, bearing, speed, and other sensor data. In one aspect, the position, bearing, and speed of the mobile device along with similar data for the media sources can be taken into account to generate a media envelope, or included set of media devices, to make available to the user. In one aspect, the selected content can be based on the compass orientation of a sensor in the mobile device. In one implementation, user preferences along with other access criteria can be used to further select content feeds.

56 Claims, 11 Drawing Sheets

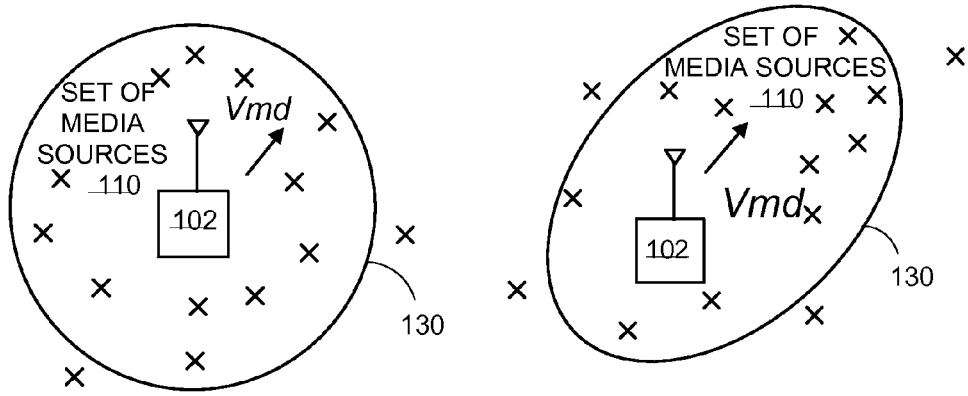
FIG. 2A
FIG. 2B
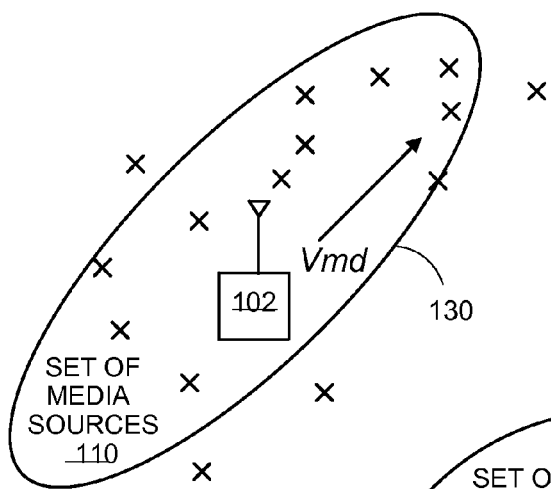
FIG. 2C
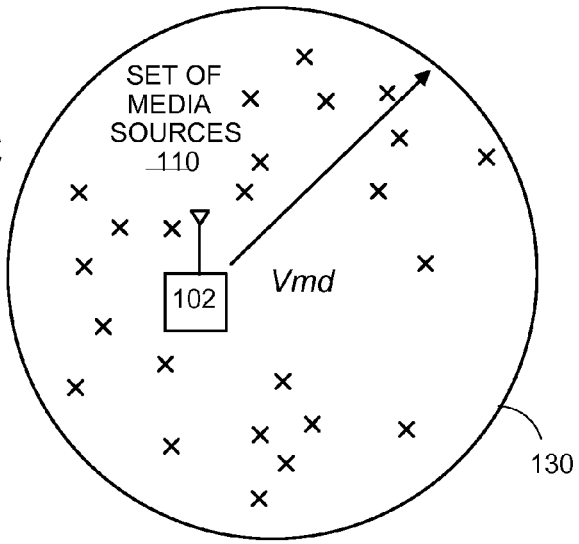
SOURCES= ALL AVAILABLE;
FILTER: TAG=CELEBRITY SIGHTING
FIG. 2D

SYSTEMS AND METHODS FOR GENERATING A SELECTIVE DISTRIBUTION OF MEDIA CONTENT FEEDS

CLAIM OF PRIORITY UNDER 35 U.S.C. §119

This application for Patent claims the benefit of U.S. Provisional Application Ser. No. 61/241,865 filed on 11 Sep. 2009 entitled "SYSTEMS AND METHODS FOR GENERATING A SELECTIVE DISTRIBUTION OF MEDIA CONTENT FEEDS," the disclosure of which is hereby incorporated by reference in its entirety.

BACKGROUND

The present teachings relate to systems and methods for generating a selective distribution of media content feeds, and more particularly, to platforms and techniques for identifying a set of mobile video or other content sources for delivery to a mobile device based on various criteria that can include data from an integrated sensor in the device, such as data from as a position, speed, or direction sensor, data processed or derived from sensor data, user preference data, and/or other criteria to define the content feeds.

The proliferation of media capture and media playback devices, along with the deployment of advanced wireless services, has increased the range of content delivery and marketing opportunities to cellular telephone and other users. Cellular telephones for instance today are commonly equipped with comparatively high-resolution imaging sensors for imaging or video capture. Today's cellular telephone or other users can uses those capture devices to upload video clips or still images to personal Web pages, social networking sites, school or corporate portals, or other destinations to share video or other media content with friends, family members, colleagues and others.

In existing media sharing platforms, an option can sometimes be provided to filter the content delivered to a mobile device based on a position of the device. For example, geo-tagged video clips can be offered or delivered to a user based on their current location, for instance as reported by a Global Positioning System (GPS) chip built into the cellular device. While location-based services of these types may be useful to restrict the geographic range of offered content, certain limitations on location-based delivery platforms exist.

For one, existing media delivery platforms have no capability to leverage the predictive effect of a user's direction of movement. It may be assumed that media sources that lie within a projected travel path of a mobile device will generally be of potentially greater interest to the user than sources located outside that path. For instance, media feeds from points of interest, such as museums, restaurants, or concerts that lie within a projected travel path of a mobile device may represent events or destinations which the user can reach with relative convenience, and therefore be of greater interest to that user.

For another, the availability, number, and type of media capture devices and services are significant and only increasing. Over time, as a consequence, the number of available video feeds or other content streams surrounding a user's current location can or will eventually become large and difficult to manage, if not overwhelming, to many users in the absence of effective reduction techniques. For another, existing delivery platforms do not discriminate media sources based on the directional orientation, or compass, of the camera or other sensor on a mobile device. That is, media sources that intersect the view field or frustum of a mobile device may be of greater potential interest than sources outside that field of view. For another, the content delivery platforms do not permit a user to discriminate desired feeds based on characteristics of the capture device, such as the model, manufacturer, resolution, or other features of the media capture hardware.

For yet another, content delivery mechanisms that are in use today may not take into account user preferences, such as preferences for certain types of food, music, entertainment, or other preferences, to refine the content selections that may be available to the user, whether within a current geographic zone, or outside their located geographic area. Instead of delivering content based on simple location-based selection options, it may be desirable to provide methods and systems which can receive and apply comparatively more sophisticated and selective access criteria to a potentially large population of media sources, and thereby provide a user more targeted content that is more sharply focused on their content interests, user preferences, preferred hardware identification, view orientation, and/or projected travel surroundings, among other selection criteria.

SUMMARY

One or more implementations of the present teachings relate to systems and methods for generating a selective distribution of media content feeds. Aspects of the present teachings relate to a method of identifying content for delivery to a mobile device, including features of identifying a set of media sources available in a network, and identifying at least a subset of the set of media sources for delivery to the mobile device based on a set of access criteria. In one or more aspects, the set of access criteria can comprise at least one of (a) position, speed, and direction data for the mobile device, (b) compass orientation data for a video sensor of the mobile device, or (c) a set of static data associated with the set of media sources.

One or more aspects of the present teachings relate to a media delivery system, including features of an interface to a set of media sources in a network, and a server, communicating with the set of media sources via the interface, the server being configured to identify at least a subset of the set of media sources for delivery to a mobile device based on a set of access criteria. In one or more aspects, the set of access criteria can comprise at least one of (a) position, speed, and direction data for the mobile device, (b) compass orientation data for a sensor of the mobile device, or (c) a set of static data associated with the set of media sources.

One or more aspects of the present teachings relate to a media delivery system, including features of means for interfacing to a set of media sources in a network, and means for serving data, communicating with the set of media sources via the means for interfacing, the means for serving data being configured to identify at least a subset of the set of media sources for delivery to a mobile device based on a set of access criteria. In aspects, the set of access criteria can comprise at least one of (a) position, speed, and direction data for the mobile device, (b) compass orientation data for a sensor of the mobile device, or (c) a set of static data associated with the set of media sources.

One or more aspects of the present teachings relate to a computer program product, including features of computer readable media comprising at least one instruction for causing a computer to identify a set of media sources available in a network, and at least one instruction for causing a computer to identify at least a subset of the set of media sources for delivery to a mobile device based on a set of access criteria. In one or more aspects, the set of access criteria can comprise at least one of (a) position, speed, and direction data for the mobile device, (b) compass orientation data for a video sensor of the mobile device, or (c) a set of static data associated with the set of media sources.

One or more aspects of the present teachings relate to a method of receiving content in a mobile device, including features of generating at least one of (a) position, speed, and direction data for the mobile device, (b) compass orientation data for a video sensor of the mobile device, or (c) a set of static data associated with the set of media sources. In one or more aspects, features can further include initiating access to at least a subset of a set of media sources available in a network for delivery to the mobile device based on a set of access criteria, the set of access criteria including at least one of the position, speed, and direction data and the compass orientation data.

One or more aspects of the present teachings relate to a mobile device, including features of a wireless interface to at least one content server via a network, and a processor, the processor communicating with the at least one content server via the wireless interface, the processor being configured to capture at least one of (a) position, speed, and direction data for the mobile device, or (b) compass orientation data for a video sensor of the mobile device, and initiate access to at least a subset of a set of media sources available in the network for delivery to the mobile device based on a set of access criteria. In one or more aspects, the set of access criteria can include at least one of the position, speed, and direction data, the compass orientation data, or a set of static data associated with the set of media sources.

According to one aspect, a mobile device is provided. The mobile device can include features of means for providing a wireless interface to at least one content server via a network, and means for processing data, the means for processing data communicating with the at least one content server via the means for providing wireless interface, the means for processing being configured to capture at least one of (a) position, speed, and direction data for the mobile device, or (b) compass orientation data for a video sensor of the mobile device, and initiate access to at least a subset of a set of media sources available in the network for delivery to the mobile device based on a set of access criteria. In one or more aspects, the set of access criteria can include at least one of the position, speed, and direction data, the compass orientation data, or a set of static data associated with the set of media sources.

One or more aspects of the present teachings relate to a computer program product, including features of computer readable media comprising at least one instruction for causing a computer to generate at least one of (a) position, speed, and direction data for the mobile device, or (b) compass orientation data for a video sensor of the mobile device, and at least one instruction for causing a computer to initiate access to at least a subset of a set of media sources available in a network for delivery to the mobile device based on a set of access criteria. In one or more aspects, the set of access criteria can include at least one of the position, speed, and direction data, the compass orientation data, or a set of static data associated with the set of media sources.

One or more aspects of the present teachings relate to a method of capturing media content via a media source device, including features of capturing at least one type of media content via the media source device, capturing content metadata for the at least one type of media content, the content metadata comprising at least one of (a) position, speed, and direction data for the media source device, (b) compass orientation data for a video sensor of the media source device, (c) a content category type for content captured via the media source device, or (d) a set of static data associated with the media source device. Features can further include initiating the upload of media content and the content metadata to the at least one content server for delivery to a mobile device based at least on the content metadata.

One or more aspects of the present teachings relate to a media source device, the media source device including features of an interface to at least one content server via a network, and a processor, the processor communicating with the at least one content server via the interface, the processor being configured to capture at least one type of media content, and capture content metadata for the at least one type of media content, the content metadata comprising at least one of (a) position, speed, and direction data for the media source device, and (b) compass orientation data for a video sensor of the media source device, (c) a content category type for content captured via the media source device, or (d) a set of static data associated with the set of media sources. In one or more aspects, the processing can further be configured to initiate the upload of media content and the content metadata to the at least one content server for delivery to a mobile device based at least on the content metadata.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 2A-2D illustrate a set of media selection envelopes determined under varying conditions of a recipient mobile device, according to one or more aspects;

DETAILED DESCRIPTION

Figure 1:
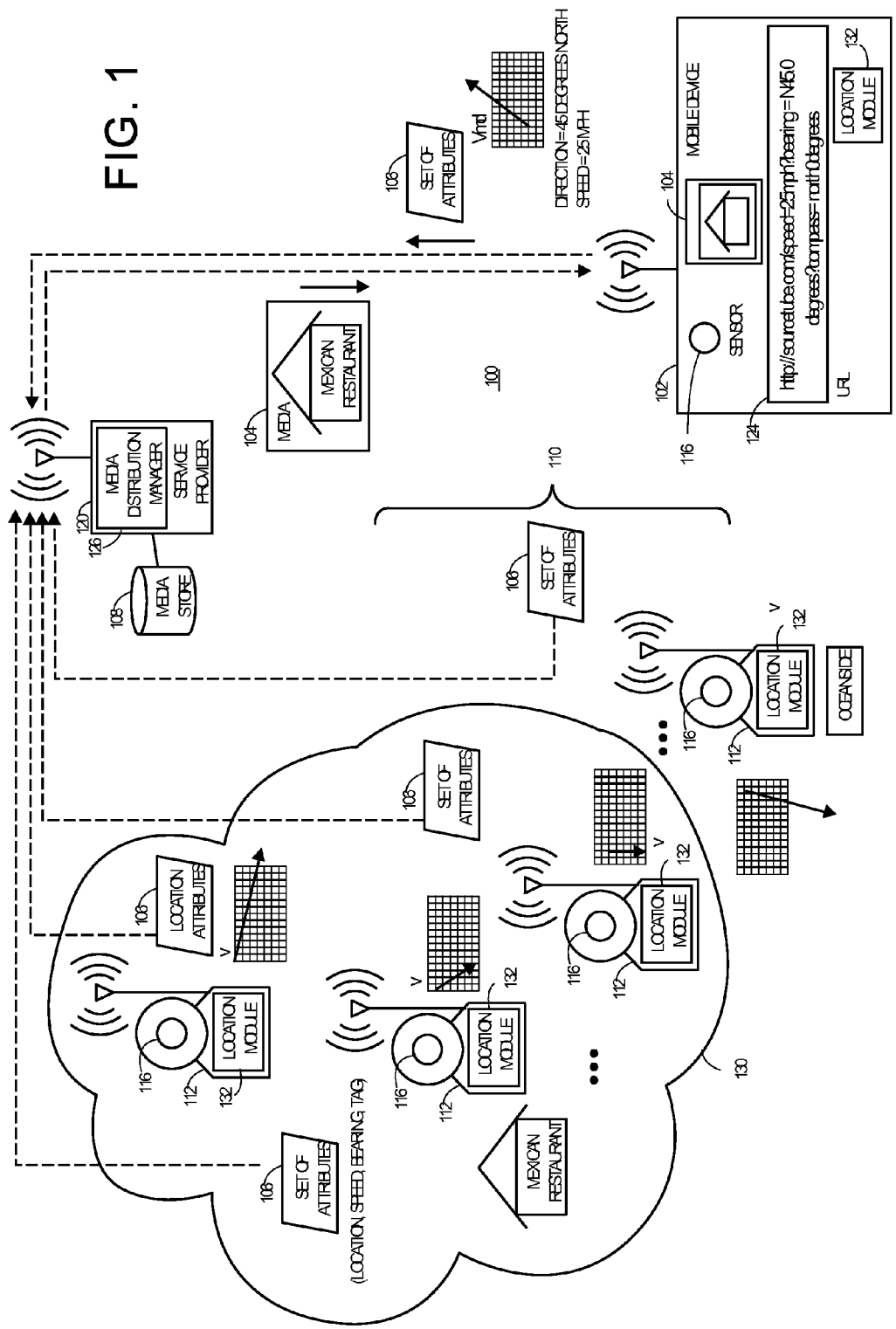
FIG. 1 illustrates an overall system for generating a selective distribution of media content feeds, including source selection based on position, speed, and bearing information for a mobile device, according to one or more aspects of the present teachings.

One or more aspects of the present teachings relate to systems and methods for generating a selective distribution of media content feeds. More particularly, one or more aspects relate to platforms and techniques for identifying, aggregating, and distributing media content from a population of media sources to a mobile device based on a set of advanced criteria that can include sensor data such as the location, travel path, and/or compass orientation of the subject device. Content selection can further be performed based on sensor data that is processed or manipulated after capture in the device. Content selection can in addition be predicated on static data representing hardware features, brand, or model information of the capture device, as well as on user preferences or profiles associated with the mobile device.

In one or more aspects, a service provider can manage and distribute media to a mobile device based on the sensor-detected location and projected surrounding pathway of that device, selecting media sources located within a defined boundary or range of the location and projected pathway of the mobile device for inclusion in the user's potential media selections. The media sources can be updated based on the reported location, speed, and bearing of the mobile device sensed by an integrated or onboard GPS or other positioning sensor, whose raw and/or processed data can be used to select sources within a projected travel path. In one or more aspects, the boundary or envelope within which sources of potential interest are identified can be generated as a dynamic function of the speed and other parameters of the mobile device, and/or as a function of similar parameters of the media sources.

In one or more aspects, in addition to or instead of the location, speed, and bearing of the mobile device, media sources can be selected based on a compass orientation of a video camera or other sensor in the device, as for instance sensed by an electromagnetic compass or other orientation-sensing device. The content delivery platform of the present teachings can capture the orientation or pointing direction of the mobile device and/or its media sensors, so that media sources toward which the mobile device is pointed can be selected and displayed.

In one or more further aspects, media sources can be selected based on static or hardwired data related to those sources, such as the brand, model, firmware version, video resolution, and/or other characteristics of the device itself, so that, for instance, video cameras of a preferred brand or with a resolution greater than a certain number of megapixels can be selected within a given travel path or other area.

In still one or more further aspects, media sources can in addition or instead be filtered by user-selected or user-associated preference settings, such as an indication of the categories or types of media content that the user wishes to receive, or based on a social networking group of which the user is a member.

Reference will now be made in detail to exemplary embodiments of the present teachings, which are illustrated in the accompanying drawings. Where possible the same reference numbers will be used throughout the drawings to refer to the same or like parts.

In the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

FIG. 1 illustrates an overall network 100 in which systems and methods for generating a selective distribution of media content feeds can operate, according to one or more aspects of the present teachings. In one or more implementations as shown, a mobile device 102 can communicate with a service provider 120 to receive media 104 and exchange other data. Media 104 can be or include for example video streams or clips, still images, audio samples, and/or other content or information. In one or more aspects, some or all of media 104 can be captured and received from a set of media sources 110 for aggregation, selection, and delivery to mobile device 102. Set of media sources can consist of one or more media source device 112, each of which can include one or more sensor 116 such as a video camera. In one or more aspects, the selection of sources within overall set of media sources 110 whose content streams will be delivered to mobile device 102 can be identified or filtered using a set of access criteria which can include sensor data such as position or compass orientation as reported by sensors onboard mobile device 102, as criteria related to processed sensor data, such as speed, acceleration, or bearing of device 102. Access criteria can likewise include specifications or preferences for certain types of media capture devices in one or more source device 112, such as particular brands or types of cameras, or cameras having a certain resolution. Access criteria can further include user preferences, profiles, or other filters or information supplied by or related to the user themselves, such as category tags, favorite sources, preferred locations, and/or other parameters, as described herein.

Service provider 120 can comprise a media distribution manager 126 or other logic to aggregate, organize, and manage the selection and distribution of media from set of media sources 110 for delivery to mobile device 102. Service provider 120 can communicate with and maintain a media store 108, such as a database or other data storage resources, to host media 104 and other information used to deliver selected content to mobile device 102. In one or more aspects, service provider 120 can be part of or associated with a network operator or carrier, such as a cellular network service or other service or network.

Mobile device 102 can be or include any network-enabled mobile device, client, or platform, such as a mobile cellular telephone, a network-enabled personal digital assistant, a network-enabled media player, a laptop computer equipped with a wireless interface such as a Wi-Fi™ or Wi-Max™ interface, or other device. Mobile device 102 can include a location module 132, such as a Global Positioning System (GPS) module or circuit, which can capture location fixes or other location-related information for mobile device 102. Location information captured via location module 132 can be incorporated in a set of attributes 106, which in turn can be communicated from mobile device 102 to location service 120, and used to discriminate content from set of media sources 110 for delivery to mobile device 102.

Set of media sources 110 can comprise one or more media source device 112 located throughout a geographic area, in network 100 in its entirety, and/or in other networks or storage. Each media source device 112 can be or include one or more sensors 116, such as a video camera, a still image camera, a microphone or other audio sensor, and/or other media capture or input device. In one or more aspects, each media source device 112 can comprise a location module 132 of GPS or other type, similar to mobile device 102. In one or more aspects, each media source device 112 in set of media sources 110 can generate, retrieve, or store a set of attributes 106, including position data recorded by location module 132, to combine or associate with media 104 captured via the source's sensor 116.

Media source device 112 can upload or transmit the resulting media 104 and associated set of attributes 106 to service provider 120 for distribution to one or more mobile device 102. In one or more aspects, each media source device 112 can be programmed or configured to automatically capture and upload media 104, or can operate to capture media 104 on a manual or other basis. In one or more aspects, set of media sources 110 can also or instead include resources that are not themselves media capture devices, such as servers or data stores hosting media captured from other media capture devices.

More particularly, in one or more aspects, the set of attributes 106 generated for mobile device 102, and set of attributes 106 associated with one or more media source device 112, can generally include sensor data captured from one or more sensors integrated or associated with mobile device 102. It will be appreciated that sensor data can include a variety of information captured from one or multiple sensors integrated in or connected to one or more media source device 112 and/or mobile device 102. Sensor data can include, for instance, latitude and longitude or other location coordinates generated by location module 132, as well orientation data captured by a compass sensor. Sensor data can or include other types of information, including for instance vibration, shaking, and/or acceleration data reported from an accelerometer, sonar data captured by a sonar module, or radar data captured from a radar transponder. Sensor data can further include, merely by way of example, temperature data, altitude data, atmospheric pressure data, spectrographic data, ambient sound level data, force, torque, or axis data, or other types of information related to the physical surroundings of a device hosting or connected to the sensor(s). Sensor data can include other raw, direct, or unprocessed data captured directly from one or more sensor associated with mobile device 102, one or more media source device 112, and/or other devices. In one or more aspects, each of one or more media source device 112 and/or mobile device 102 can contain or utilize more than one sensor.

Set of attributes 106 can further include processed sensor data that is computed or derived from sensor data, including variables such as speed, acceleration, and/or bearing of the subject device, which can for instance be derived from raw position data reported by location module 132. In one or more aspects, the speed, acceleration, and/or bearing (or direction) of mobile device 102 and/or a media source device 112 can for example be obtained by periodically sampling a location fix generated by location module 132. In one or more aspects, processed sensor data can be generated by a variety of computational techniques or platforms, including, for example, neural networks, fuzzy logic, and/or other processing techniques.

Set of attributes 106 can further include static data related to the characteristics of one or more media source device 112, mobile device 102, and/or other participating hardware client or device. For instance, static data can encode the manufacturer, model identifier, and/or performance characteristics of one or more media source device 112. The static data related to a video camera can, for example, include the manufacturer name, model number or other identifier, serial number, operating system, firmware revision, pixel resolution, audio bit resolution, memory size, and/or other comparatively fixed or hardwired characteristics of those devices that can be associated with the media 104 delivered from those devices. Viewers can then for instance select or filter for content matching criteria related to the media capture hardware itself, such as video feeds in High-Definition (HD) resolution or other specifications.

The set of attributes 106 can also include additional information such as user preference, profile, and/or other configuration data, for instance, a set of keyword tag or tags reflecting a type or category of media which the user of mobile device 102 wishes or prefers to receive. In one or more aspects, the relationship between set of attributes 106 for mobile device 102, as well as the set of attributes 106 set of media sources 110, and/or user-related attributes or preferences and other information, can be used to discriminate media 104 which may be of particular interest to the user of mobile device 102, as described herein.

In one or more aspects in various regards, the discrimination of media 104 can be based on motion characteristics of mobile device 102 as reported by location sensor data and/or processed location sensor data, among other information. In one or more aspects according to these regards, service provider 120 can determine or establish a media envelope 130 surrounding the projected path of travel of mobile device 102 to select media 104 to present to the user of mobile device 102 as available options for viewing or consumption. Service provider 120 can likewise employ the compass orientation of mobile device 102, static data related to one or more media source device 112, and/or any associated user preferences to organize, categorize, and ultimately filter media 104 for presentation to the user of mobile device 102.

According to one or more aspects in one regard, and as for instance also illustrated in FIG. 1, the set of attributes 106 associated with mobile device 102 can comprise sensor data and/or processed sensor data including the location, speed, bearing, and compass of mobile device 102, as well as device-related static data and/or user preferences associated with the user of that device at a given time. When used as part of set of attributes 106, the location, speed, and/or bearing data can locate mobile device 102 within a given geographic area at a given time, and identify the speed and direction of that device in transit.

Service provider 120 can also analyze a corresponding set of attributes 106 and data for set of media sources 110 to identify one or more media source device 112 located within a media envelope 130 of mobile device, for potential delivery to mobile device 102. In one or more aspects, media envelope 130 can represent a boundary or range surrounding mobile device 102 within which one or more media source device 112 of interest to the user of mobile device 102 may reside. In one or more aspects, the selection of media sources can be based on the projected travel path of mobile device 102 relative to those media sources. That is, based on the set of attributes 106 of mobile device 102, as shown, it may be determined that mobile device 102 is moving in a northeasterly (e.g., 45 degrees from north) direction at moderate (e.g., 25 mph) speed. (In FIG. 1 and elsewhere, the relative speed of entities including mobile device 102 may be denoted in vector notation as $v_{md}$ or similar, and reflected as an illustrative vector indicating a proportional speed of that device).

Based on that sensor or processed sensor data, as shown, it may be determined that within a forward trajectory of mobile device 102, at least two media source devices 112 are present (as shown, e.g., a restaurant and concert site) which may be within an identified travel range and therefore of possible interest to the user of mobile device 102. The media envelope 130 can be generated as a regular or irregular boundary associated with the location of mobile device 102, such as an ellipse projecting forward from the location of mobile device 102. According to one or more aspects, media envelope 130 need not be physically or numerically generated as an actual set of boundary points or curve surrounding mobile device 102, but can be represented as a maximum distance from mobile device 102 from which content sources may be identified or selected.

More particularly, in one or more aspects, and as shown for example in FIGS. 2A-2D, in terms of source discrimination based on sensor data and/or processed sensor data encoding the location, speed, and/or bearing data for mobile device 102, the boundary of media envelope 130 can be configured to dynamically elongate along the axis of motion of mobile device 102 as a function of the present speed of mobile device 102. (In FIGS. 2A-2D, the media source devices in set of media sources 110 are pictorially shown as small "x" markings, for simplicity). As shown for instance in FIG. 2A, media envelope 130 can be calculated or generated to be a simple circle surrounding mobile device 102, when for instance mobile device 102 is stationary, or below a relatively low speed threshold (e.g., below 10 mph or other values). These conditions may pertain for instance when the user of mobile device 102 is walking.

As shown for instance in FIG. 2B, media envelope 130 can be calculated or generated to adopt a moderately elongated or elliptical shape along a direction of travel of mobile device 102, when that device is moving at a moderate speed (e.g., up to 25 mph or other values). These conditions may pertain for instance when the user of mobile device 102 is riding a bicycle. As shown for instance in FIG. 2C, media envelope 130 can be calculated or generated to adopt a somewhat more sharply elongated or elliptical shape along a direction of travel of mobile device 102, when that device is moving at increased or moderately fast speeds (e.g., 25-55 mph or other values). These conditions may pertain for instance when the user of mobile device 102 is traveling in a car.

As shown for further instance in FIG. 2D, media envelope 130 can be calculated or generated to adopt a relatively wide circular shape surrounding mobile device 102, when that device is moving at a relatively high speed (e.g., over 75 mph or other values), such as when the user of mobile device 102 has boarded a train. In one or more aspects in various regards, during high-speed travel of mobile device 102, the media envelope 130 can be set to be large or unlimited, to cause the selected sources to default to all available sources, since location, speed, bearing, and/or other characteristics may make the relative location of the sources less relevant to the user when traveling at a high rate of speed, since access to nearby points of interest may be impractical.

In scenarios in these regards, when a network-wide or all-available media envelope 130 is used, and/or at other times, one or more media source device 112 can be selected from set of media sources 110 based on other parts of set of attributes 106, such as static device data and/or user preferences, as described herein. In further aspects, the boundary or limits of media envelope 130 can take on other regular or irregular shapes, contours, or configurations. It may be noted that in one or more aspects, media envelope 130 can be calculated or generated based on a most-current set of attributes 106 for mobile device 102 and/or set of media sources 110. In one or more aspects, media envelope 130 can be dynamically updated or adjusted based on updates to set of attributes 106 for either mobile device 102, set of media sources 110, and/or both.

Returning to FIG. 1, in terms of source selection based on sensor-detected speed, direction, and/or bearing, in one or more aspects as shown a media source device 112 (e.g., installed at an oceanside park or other site) located outside the boundary of media envelope 130 can be omitted from any set of selected sources from which a traveling mobile device 102 can receive and view media 104. For one or more media source device 112 located within media envelope 130, service provider 120 can generate a view or notification, such as a thumbnail view or source identification list, to transmit to mobile device 102 for potential selection and viewing. The user of mobile device 102 can therefore be presented with a range of media selections that have been discriminated based on the user's travel path and/or other set of attributes 106, compared to those of set of media sources 110. This discrimination of one or more media source device 112 based on these criteria results in selected media 104 which is more closely aligned with the user's potential interests and immediate travel surroundings.

It may be noted that in one or more aspects, besides a projected travel path or travel range, the one or more media source device 112 can also or instead be selected for delivery to mobile device based on a projected intersection with that source device or devices. That is, in one or more aspects, rather than aggregate each media source device 112 within a boundary determined by the location, speed, and bearing of mobile device 102, service provider 120 can constrain the one or more media source device 112 presented to the mobile device 102 to those sources which will actually or substantially intersect the path of mobile device 102, or intersect within a relatively small margin (e.g., within 100 feet). In one or more aspects, the intersection criteria can be specified by the user of mobile device 102, and can, for instance, be used to supply media 104 from sites the user expects to physically encounter.

Figure 3:
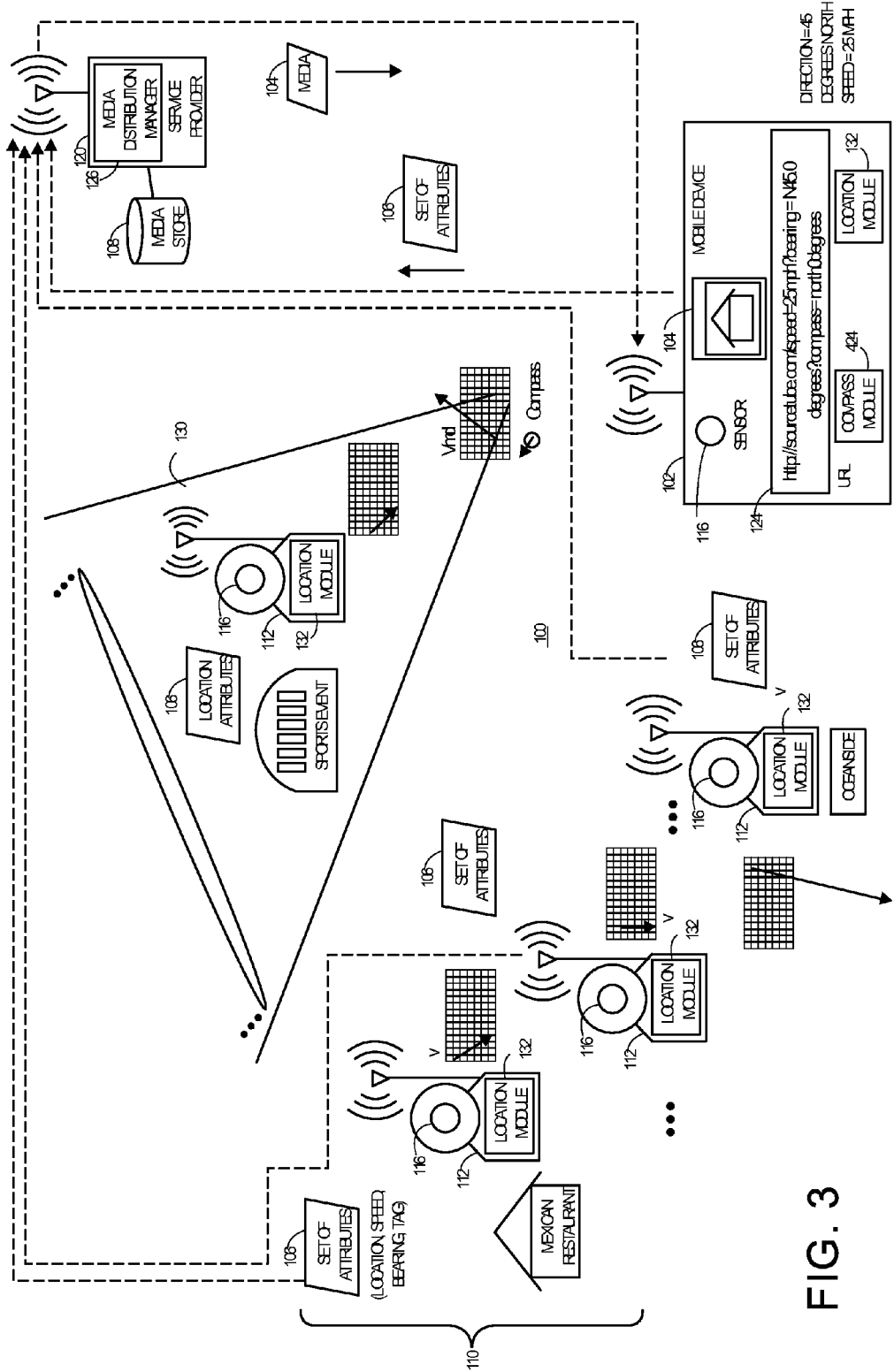
FIG. 3 illustrates an overall system for generating a selective distribution of media content feeds, including source selection based on compass orientation for a sensor in a mobile device, according to one or more aspects.

In one or more aspects in further regards, and as for example shown in FIG. 3, in terms of source selection, in addition to or instead of the location, speed, and bearing of mobile device 102 and the associated travel path of that device, media sources can be selected for delivery based on a compass orientation of a video camera or other sensor 116 embedded in mobile device 102. That is, in one or more aspects as shown, a mobile device 102 having a video camera or other sensor 116 can be pointed or trained in a certain compass or rotational direction. In these aspects, the user of mobile device 102 may be assumed to have greater interest in one or more media source device 112 located within the three-dimensional field of view, or frustum, of mobile device 102.

In such aspects, the compass orientation of a sensor in mobile device 102 can be captured using a magnetic, radio, or other compass module 424 and incorporated in set of attributes 106, and transmitted to service provider 120. Compass module 424 can for instance comprise a gyroscope, electronic compass, accelerometer, and/or other sensor. Service provider 120 can receive the compass data, and in this case identify one or more media source device 112 (e.g., a sports event as shown) located in media envelope 130 represented as a three-dimensional section or frustum. The user of mobile device 102 can likewise then receive a thumbnail, list, or other notification or view of the one or more available media source device 112 contained within that three-dimensional view or section. In one or more aspects, the media envelope 130 derived from a compass orientation of mobile device 102 can be generated without factoring in the location, speed, direction, and/or other data in set of attributes 106 for mobile device 102. In one or more aspects, the media envelope 130 derived from a compass orientation of mobile device 102 can be generated while also factoring in the location, speed, direction, and/or other data in set of attributes 106 for mobile device 102. In the latter case, media sources located not just in the projected pathway of the mobile device 102, but along a compass orientation, or being categorized within preferred content categories, can be selected. Other combinations of content selection criteria are possible. In further aspects, and as for example shown in FIG. 4, again in terms of source selection, in addition to or instead of the projected travel path and/or compass orientation of mobile device 102, media sources can be selected for delivery based on a set of user preferences 134 associated with a user of mobile device 102.

Figure 5:
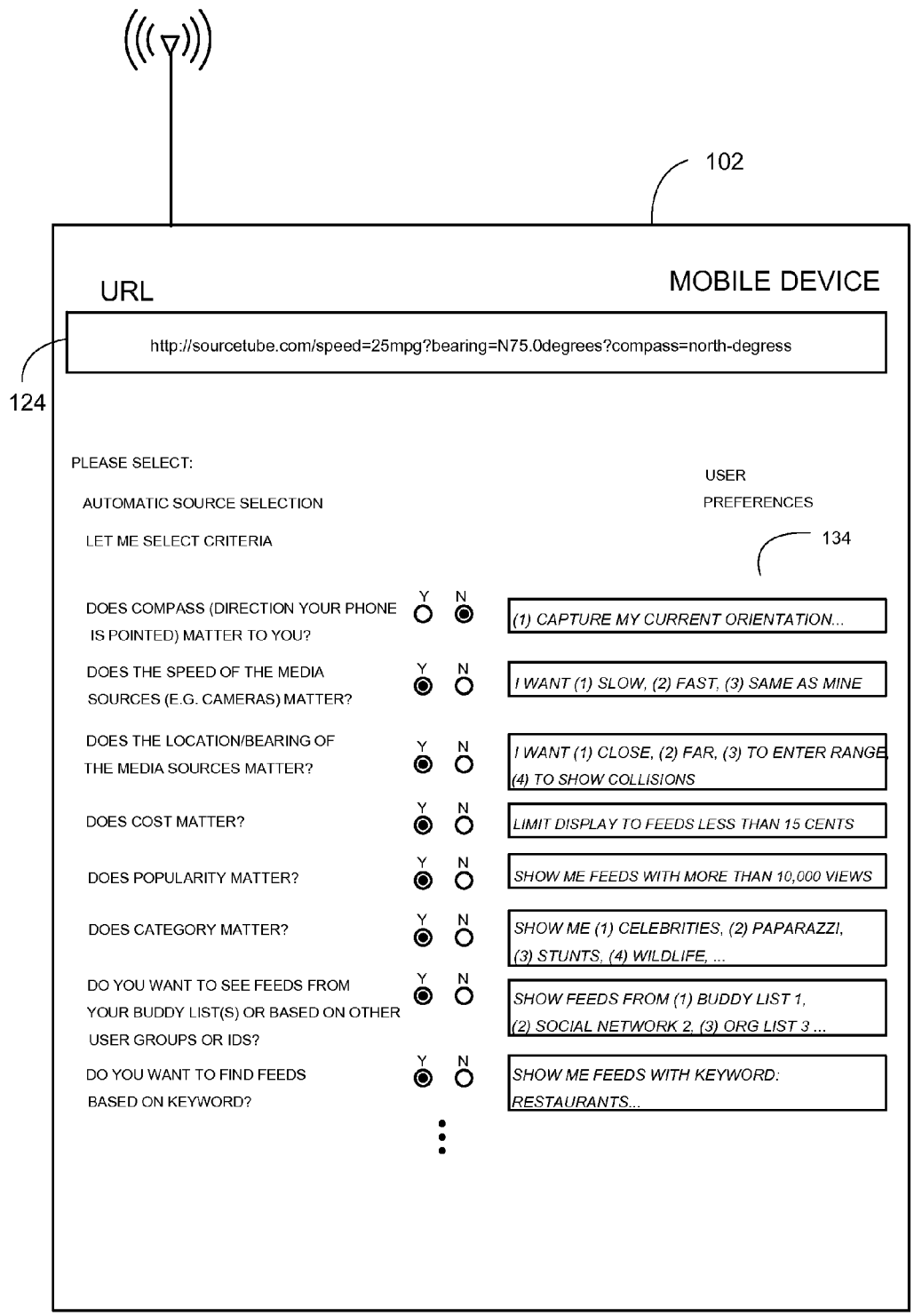
FIG. 5 illustrates a user interface for a mobile device and the capture of user preferences, according to one or more aspects.

That is, as for instance shown in more detail in FIG. 5, in one or more aspects as shown, a user of mobile device 102 can enter or register a set of user preferences 134 related to the operation of mobile device 102, and/or the selection of one or more media source device 112 within set of media sources 110. In aspects as shown, set of user preferences 134 can be or include preferences, filters, specifications, and/or criteria related to a number of variables including compass orientation, the speed of media sources the user wishes to select, the location/bearing of media sources, the cost of accessing or viewing media sources, the popularity rating of media sources, media category types, buddy list or other social networking groups, keywords to be matched in the attributes of selected media 104, and/or other preferences. In one or more aspects, media categories can be specified in set of user preferences 134 such as, for instance, celebrity sightings, restaurant locations, musical venues, sports events or stadiums, recreational sites, and/or other categories or classes of media 104. In one or more aspects, user preferences 134 can for instance be entered via a dialogue on mobile device 102 as shown, or registered through other means, such as the Internet.

In one or more aspects in additional regards, user preferences 134 can specify hardware characteristics and/or other fixed or static data related to one or more media source device 112, set of media sources 110, and/or other media capture or delivery hardware or platforms. For instance, a user can specify that they wish to receive video streams captured from cameras made by a certain manufacturer, having a certain pixel resolution or frame rate, having a certain file format, or having other comparatively static characteristics. For further instance, when media 104 includes audio content, the user can specify that they wish to receive audio feeds from a concert or speech where the audio encoder captures at least sixteen bit audio clips in stereo at 44.1 kHz (compact disc standard), meets other requirements. Other criteria can be used.

In one or more aspects in yet further regards, in may be noted that keywords or other criteria or fields in user preferences 134 need not be manually entered by the user of mobile device 102. For instance, a user can operate sensor 116 of mobile device 102 to initiate a visual search on a scene they are viewing to retrieve keywords for tagging or search purposes. A visitor to a zoo, for instance, can point sensor 116 at a panda bear or other animal of interest, initiate a search for similar identified content via service provider 120, as understood by persons skilled in the art. The user can then retrieve search or keyword matching results for media sources having a content tag of "panda." Other types of automated entry or importation of user preferences 134 can be incorporated or used. For example, user preferences, play lists, and/or other data collected from the user's social networking profile can be imported or used.

By specifying user preferences 134 as shown, a user can consequently create filters on their selected media, such as media category types to indicate the types of media or content the user wishes to receive. In one or more aspects, the user as noted can enter a category type or keyword, such as "celebrity," and a cost constraint, such as 15 cents, to indicate that the user wishes to potentially view media 104 generated by a media source device 112 that is related to a celebrity or other public figure while having a download cost of that amount per download or less. In one or more aspects in these regards, media 104 generated by set of media sources 110 can have or receive an associated tag or category type as part of set of attributes 106 of media 104, for instance, assigned by an operator of a given media source device 112 or assigned by service provider 120.

Figure 4:
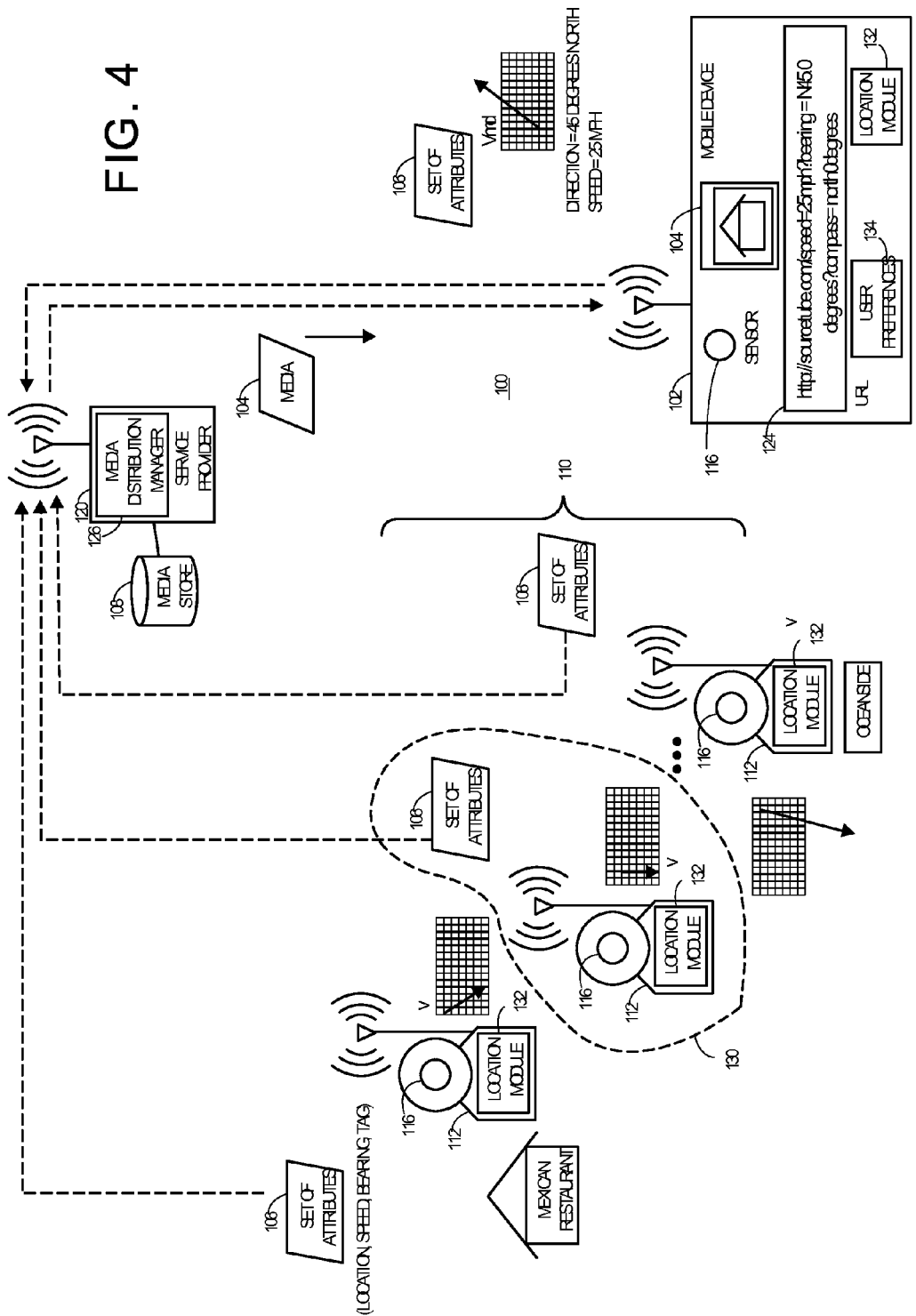
FIG. 4 illustrates an overall system for generating a selective distribution of media content feeds, including source selection based on user preferences, according to one or more aspects.

In one or more aspects, and as likewise shown in FIG. 4, media 104 generated by a media source device 112 having a tag or keyword matching one or more of user preferences 134 associated with mobile device 102, such as a media feed from a celebrity concert site as shown, can thereby be included or encompassed within media envelope 130 (here, potentially a function of content rather than strictly position) and transmitted for selection to mobile device 102 via a thumbnail, list, or other view or notification. In one or more aspects, selection of one or more media source device 112 based on user preferences 134 can be generated without factoring in the location, speed, direction, compass orientation, and/or other data in set of attributes 106 for mobile device 102. In one or more aspects, selection of one or more media source device 112 based on user preferences 134 can be generated while also factoring in the location, speed, direction, compass orientation, static capture device data, and/or other data in set of attributes 106 for mobile device 102, so that media sources located not just in the projected pathway and/or frustum of the mobile device 102, but also containing media 104 of specified categories, capture device specifications, or other preference types, are selected. Other combinations of content selection or access criteria are possible.

It may be noted that in various implementations, including those involving media selection criteria as illustrated for instance in FIGS. 1-5, service provider 120 can employ machine learning or feedback systems to learn the viewing or selection patterns of the user of mobile device 102, and thereby enhance the selection mechanisms used for that user. In one or more aspects, for example, service provider 120 can maintain a record or log of the user's various media selections under different conditions to identify any habits, preferences, or patterns that may be implicit in the user's media selection behavior. Thus, for instance, if a user regularly selects to view one or more media source device 112 and related media 104 that relates to sporting events rather than music, service provider 120 can configure the delivered media 104 to include sports-related video feeds or other media 104 at the top of the user's list of available content. In further aspects, service provider 120 can track explicit or implicit feedback about user selection patterns to identify which parts of media 104 presented to the user came closest to the user's interest. Thus, for instance, service provider 120 can track viewing selections for which the user rarely or never initiates a download, versus selections for which the user immediately or frequently makes a download selection. In one or more aspects, a user dialogue can ask the user to rate media selections for similar purposes. Other learning or selection mechanisms can be used.

Figure 6:
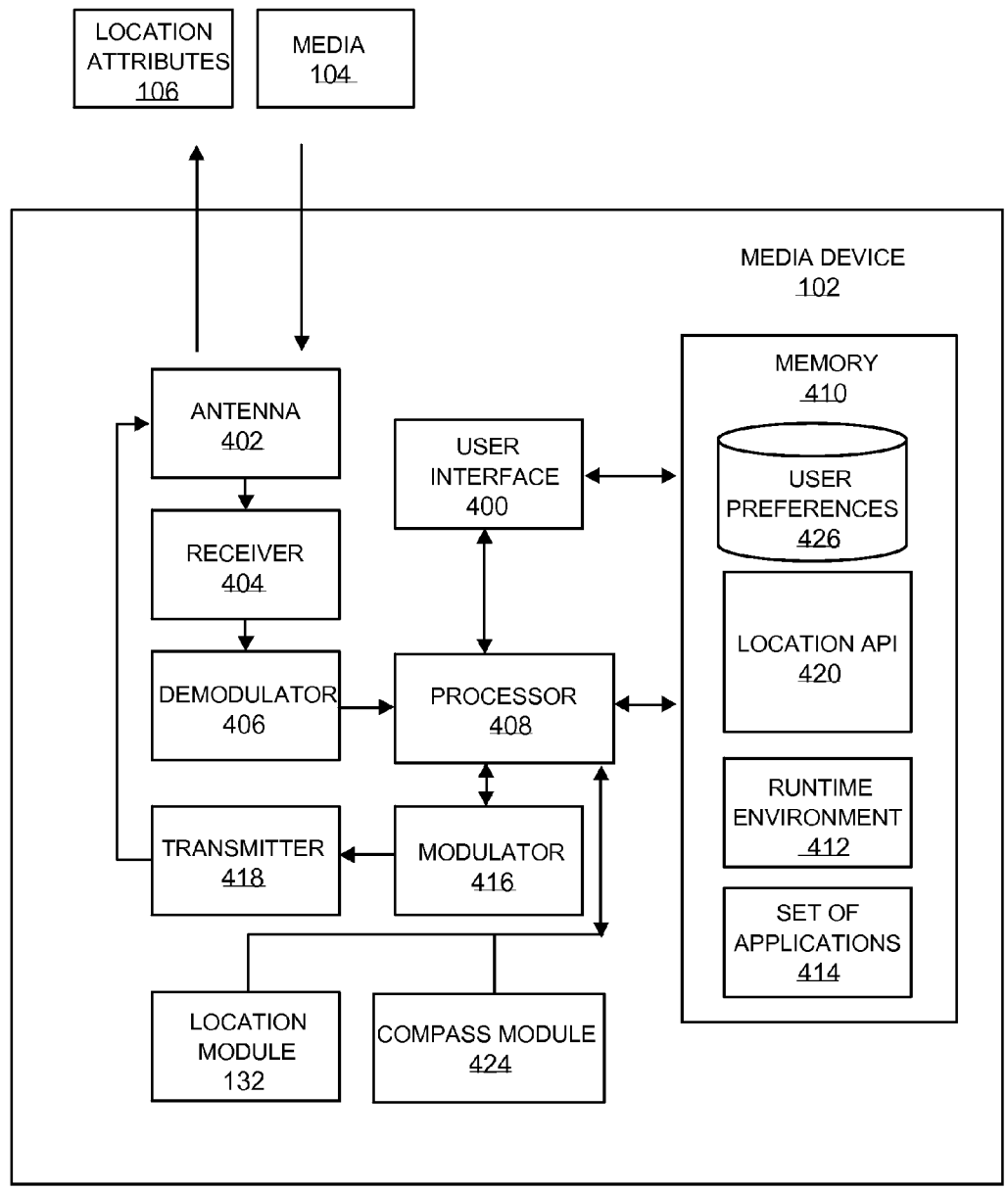
FIG. 6 illustrates an exemplary set of hardware, software, and other resources in a mobile device, according to one or more aspects.

FIG. 6 illustrates an exemplary configuration of hardware, software, and other resources of a mobile device 102, consistent with implementations of the present teachings. Mobile device 102 can include at least one antenna 402 (e.g., a transmission receiver or group of such receivers comprising an input interface) that receives a signal (e.g., pertaining to a mobile call initiation or other handshake, a handshake response, a mobile application data transfer, a data event, data event response, handshake termination, and so on) and a receiver 404, which performs actions (e.g., filters, amplifies, down-converts, etc.) on the received signal. Antenna 402 can be further coupled to a transmitter 418 to transmit signals. Antenna 402 can for example transmit or receive a response to a handshake request, data event request, or the like. Transmitted signals can be or include media 104, set of attributes 106, and other data, as described herein. Antenna 402 and receiver 404 can also be coupled with a demodulator 406 that can demodulate received signals and provide the demodulated information to a processor 408 for processing. Mobile device 102 can additionally include memory 410 that is coupled to processor 408 and that can store data to be transmitted, received, and the like.

Processor 408 can analyze set of attributes 106, media 104, and/or other data received by antenna 402 and/or processed via a user interface 424 of the mobile device 102, and/or generate set of attributes 106, media 104, and/or other data for transmission by a transmitter 418 via a modulator 416. Additionally, processor 408 can control and/or access one or more resources or components (e.g., 406, 412, 414, 416, and 418) of the mobile device 102. Processor 408 can execute a runtime environment 412, such as BREW® available from QUALCOMM Incorporated, as well as one or more set of applications 414 or other software, modules, applications, logic, code, or the like. Processor 408 can in implementations communicate with a compass module 424, to receive and process compass or directional information for a sensor in mobile device 102, such as to report the direction in which a video camera in mobile device 102 is pointed. Processor 408 can, in one or more implementations, likewise communicate with a location module 132, such as a Global Positioning System (GPS) module or chip, to receive and process location-related information, including location fixes for the user. Processor 408 can further communicate with a location application programming interface (API) 420 to capture and process location-related information. Processor 408 can likewise couple with user interface 424, such as a graphical user interface or other graphical display, to display graphics, video, call-related data, user activity feeds as described herein, and other information.

Figure 7:
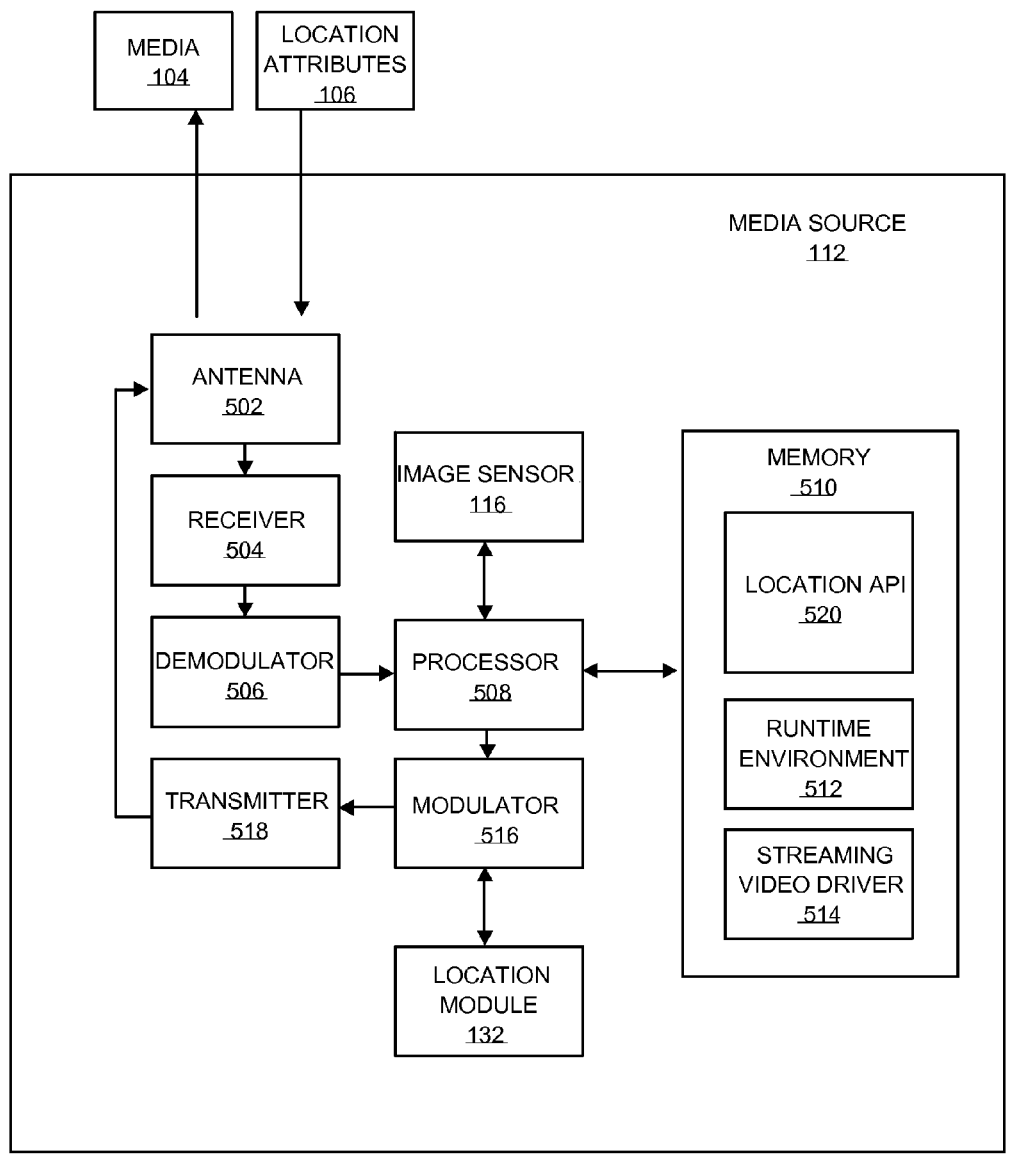
FIG. 7 illustrates an exemplary set of hardware, software, and other resources in a media source device, according to one or more aspects.

FIG. 7 illustrates an exemplary configuration of hardware, software, and other resources of a media source 112, consistent with implementations of the present teachings. In one or more aspects, media source 112 can include a sensor 116, such as a network-equipped or network-compatible video camera. In one or more aspects, media source 112 can be or include a sensor 116 such as a video camera equipped or configured to communicate with or via one or more cellular networks. In one or more aspects, sensor 116 can in addition or instead capture still images, position data, audio samples, sonar or sound-ranging samples, and/or other sensor data. In one or more aspects, media source 112 can contain more than one sensor 116, and/or be connected to external sensors or other capture devices. Media source 112 can include at least one antenna 502 (e.g., a transmission receiver or group of such receivers comprising an input interface) that receives a signal (e.g., pertaining to a mobile call initiation or other handshake, a handshake response, a mobile application data transfer, a data event, data event response, handshake termination, and so on) and a receiver 504, which performs actions (e.g., filters, amplifies, down-converts, etc.) on the received signal. Antenna 502 can be further coupled to a transmitter 518 to transmit signals. Antenna 502 can for example transmit or receive a response to a handshake request, data event request, or the like. Transmitted signals can be or include media 104 such as video content streams, still images, audio samples, set of attributes 106, and other data or metadata, as described herein. Antenna 502 and receiver 504 can also be coupled with a demodulator 506 that can demodulate received signals and provide the demodulated information to a processor 508 for processing. Media source 112 can additionally include memory 510 that is coupled to processor 508 and that can store data to be transmitted, received, and the like.

As noted, processor 508 can generate, access, capture, and/or store media 104, set of attributes 106, and/or other data or metadata for transmission by a transmitter 518 via a modulator 516. Additionally, processor 508 can control and/or access one or more resources or components (e.g., 506, 512, 514, 516, and 518) of the media source 112. Processor 508 can execute a runtime environment 512, such as BREW® runtime environment available from QUALCOMM Incorporated, as well as a streaming video driver 514 to delivery video content feeds to service provider 120 or other destination. Processor 508 can likewise execute other applications or other software, modules, applications, logic, code, or the like. Processor 508 can in implementations communicate with a location module 132, such as a Global Positioning System (GPS) module or chip, to receive and process location-related information, including location fixes for the media source 112 to embed within set of attributes 106.

Figure 8:
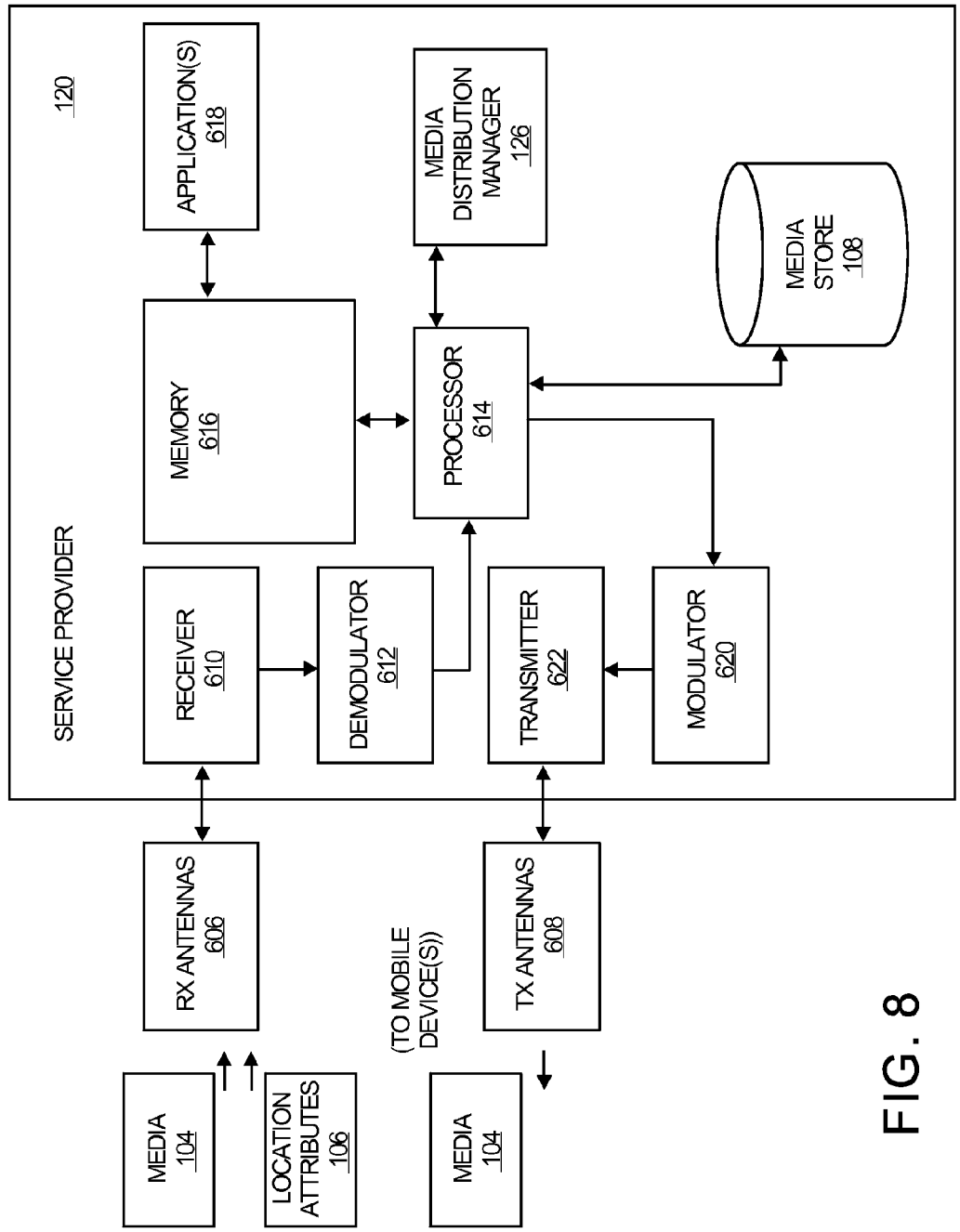
FIG. 8 illustrates an exemplary set of hardware, software, and other resources in a service provider including associated base station or wireless infrastructure components, according to one or more aspects.

FIG. 8 illustrates an exemplary set of hardware, software, and other resources that can be incorporated in, maintained by, or associated with a service provider 120 that can selectively communicate media 104 including video content streams and other data to and from one or more mobile device 102, and associated network components, according to various implementations. Service provider 120 can include, access, or communicate with a receiver 610 that receives signal(s) from one or more mobile device 102 through a plurality of receive antennas 606, and a transmitter 622 that transmits to the one or more mobile device 102 through a transmit antenna 606. Receiver 610 can receive information from receive antennas 606 and be operatively coupled with a demodulator 612 that demodulates received information. A processor 614 can analyze demodulated signals provided by demodulator 612. The processor 614 further couples to a memory 616 that can store one or more application 618 that can execute, support, facilitate and/or participate in user content delivery activities as described herein. Processor 614 can likewise communicate with a media distribution manager 126 to process media 104, set of attributes 106, and/or other data to generate and distribute media 104 and/or other content to mobile users, as described herein. Processor 614 can in addition communicate with a network interface 622, such as an Ethernet or other wired, optical, or wireless interface, to communicate with other network links or resources, such as media store 106. In implementations, processor 614 and associated resources can be hosted in a wireless server, which in implementations can be located separately or remotely from service provider 120.

Figure 9:
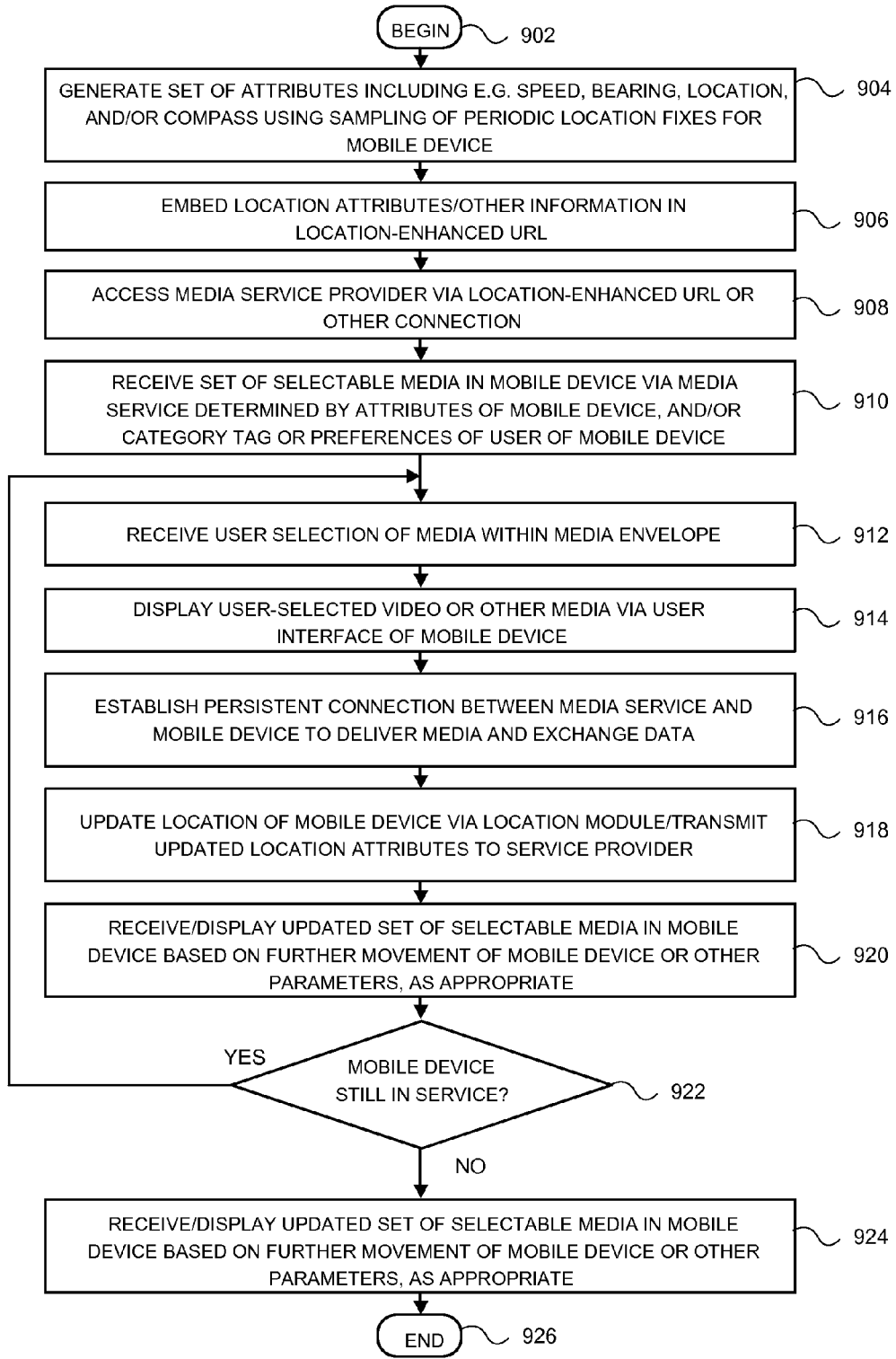
FIG. 9 illustrates a flowchart of processing for selective distribution of media content feeds, including processing that can be performed on a mobile device receiving the selected content, according to one or more aspects.

FIG. 9 illustrates aspects of selective distribution of media content feeds, including processing that can be performed on a mobile device receiving the selected content. In 902, processing can begin. In 904, mobile device 102 can generate a set of attributes 106 related to the location or position of the device. In one or more aspects, set of attributes 106 can include the speed, bearing, location, and/or compass orientation of the device. In one or more aspects, some or all of the data of set of attributes 106 can be generated from processed sensor data, such as by sampling of periodic location fixes for mobile device 102, using onboard location module 132 such as a Global Positioning System (GPS) module. In 906, the set of attributes 106 and/or other information can be embedded in a location-enhanced uniform resource locator (URL) 124 or other address or identifier. In 908, a service provider 120 can be accessed via location-enhanced uniform resource locator (URL) 124.

In 910, a set of media 104 can be received in mobile device 102 via service provider 120. In one or more aspects, media 104 can be or include video content, audio content, image content, text content, and/or other files, data, or information. In one or more aspects, the media 104 can be generated by or via sources within the boundary of a media envelope 130 surrounding or associated with mobile device 102 and/or determined by set of attributes 106 of mobile device 102. The location attributes 106 used to determine media envelope 130 with which to select sources within set of media sources 110 can be or include the location, speed, bearing, compass orientation data, hardware specifications or other static data, and/or category tags or other user preferences of the user of mobile device 102, relative to the set of media sources 110.

In 912, a user selection of media sources available within media envelope 130 or other selection set can be received in mobile device 102, for instance, via keypad selection of different content feed thumbnails. In 914, the video or other media content selected by the user can be initiated or displayed via a user interface of mobile device 102. In 916, a persistent connection can be established between the media service provider 120 and mobile device 102 to deliver media 104 and exchange other data, for instance using Web 2.0™ Ajax™, Java™ Script, uniform resource locators (URLs), and/or other protocols, formats, or channels. In 918, the location or other set of attributes 106 of mobile device 102 can be updated and transmitted to service provider 120, for instance to report a change in position, speed, bearing, compass orientation, or other data. In 920, any updated media 104 can be received and displayed on mobile device 102 based on the movement of mobile device 102 or other parameters, such as compass orientation or keyword tags. In 922, a determination can be made whether mobile device 102 is still in service with service provider 120. If the determination in 922 is yes, processing can return to 912. If the determination in 922 is no, processing can proceed to 924, where a record of user selection of media 104, device location history, and/or other information can be stored to mobile device 102, service provider 120, and/or other location. In 926, processing can repeat, return to a prior processing point, jump to a further processing point, or end.

Figure 10:
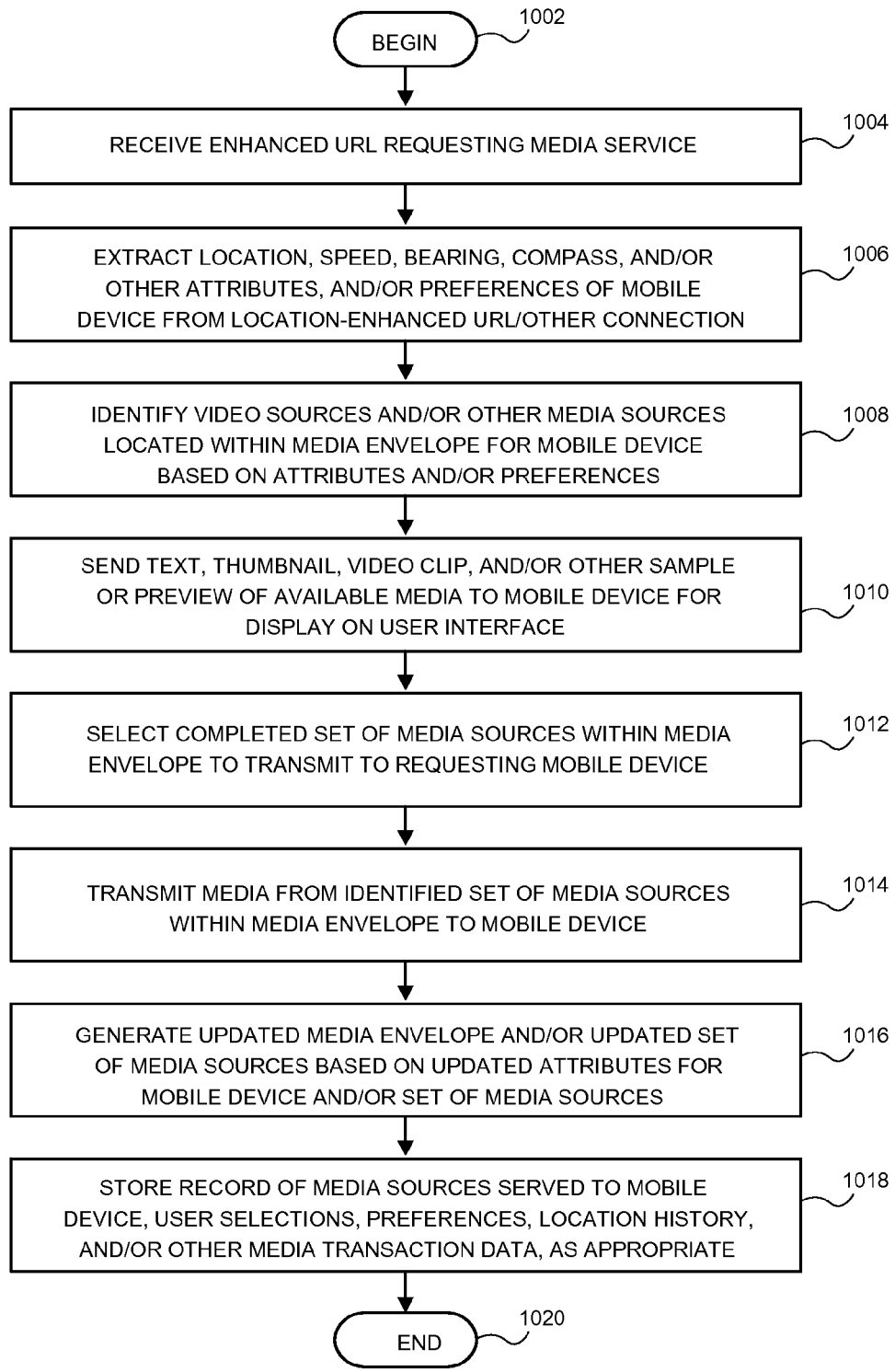
FIG. 10 illustrates a flowchart of processing for selective distribution of media content feeds, including processing that can be performed in or via a media service receiving a request for content, according to one or more aspects.

FIG. 10 illustrates aspects of selective distribution of media content feeds, including processing that can be performed in or via a media service provider receiving a request for content, according to various aspects. In 1002, processing can begin. In 1004, a service provider 120 can receive a location-enhanced uniform resource locator (URL) 124 or other identifier, address, or message requesting media delivery service. In 1006, service provider 120 can extract data such as the location, speed, bearing, compass orientation, and/or other information from set of attributes 106, and/or user preferences stored in or associated with mobile device 102, via location-enhanced uniform resource locator (URL) 124. In 1008, service provider 120 and/or logic hosted in other locations or resources can identify video sources and/or other media sources in set of media sources 110 which lie within the boundary of media envelope 130 based on the location, speed, bearing, compass orientation, hardware specifications, and/or other data in set of attributes 106, and/or user preferences, associated with mobile device 102. In 1010, service provider 120 can send a text, thumbnail, video clip, and/or other sample or preview of the available or selected media 104 within media envelope 120 or otherwise to mobile device 102 for display on the user interface of that device.

In 1012, a set of candidate media sources within set of media sources 110 within media envelop 130 or otherwise can be selected and finalized to transmit to the requesting mobile device 102. In 1014, service provider 120 can transmit media 104 from the identified set of media sources within media envelope 130 or otherwise to mobile device 102. In 1016, service provider 120 can generate an updated media envelope 130 and/or an updated set of selected media sources for delivery based on an updated set of attributes 106 for mobile device 102 and/or updated set of attributes 106 for set of media sources 110, as appropriate, for instance using a persistent connection such as Web 2.0™, Ajax™, Java™ Script, uniform resource locators (URLs), and/or other protocols, formats, or channels. In 1018, service provider 120 can store a record of the media 104 served to mobile device 102, as well as user selections, preferences, location history of mobile device 102, and/or other media or transaction data, as appropriate. In 1020, processing can repeat, return to a prior processing point, jump to a further processing point, or end.

Figure 11:
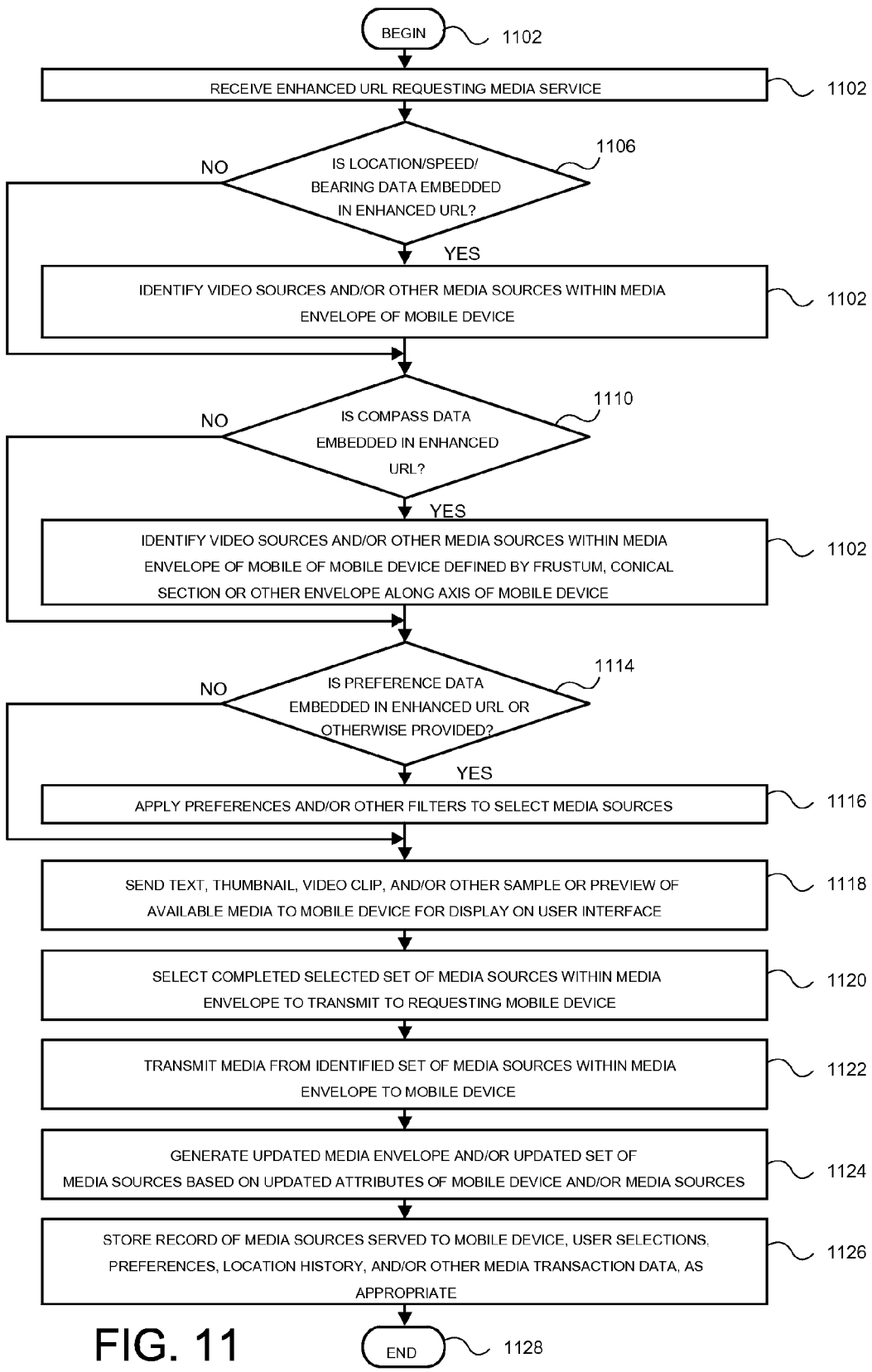
FIG. 11 illustrates a flowchart of processing for selective distribution of media content feeds, including processing that can be performed in or via a media service receiving a request for content using location-related and/or user-preference data, according to one or more aspects.

FIG. 11 illustrates aspects of selective distribution of media content feeds, including processing that can be performed in or via a media service receiving a request for content, in regards including processing can be adapted based on receipt of various sensor-related and/or user-preference data. In 1102, processing can begin. In 1104, a service provider 120 can receive a location-enhanced uniform resource locator (URL) 124 or other encoded message requesting media delivery service. In 1106, service provider 120 can make a determination whether location, speed, and/or bearing data are embedded in location-enhanced uniform resource locator (URL) 124. If the determination in 1106 is no, processing can proceed to 1110. If the determination in 1106 is yes, processing can proceed to 1108, where service provider 120 can identify video and/or other sources within set of media sources 110 within a media envelope 130 for the mobile device 102. In one or more aspects, and illustratively, a media envelope 130 can be defined by a calculation, such as, merely illustratively, $(x/(v_{md}))^2+(y*0.5v_{md})^2=1$, where: $v_{md}$ represents a speed (velocity) of mobile device 102, and x and y represent latitude and longitude components of a position of mobile device 102, thereby defining an elliptical boundary which elongates with increasing speed of mobile device 102. Other functions, calculations, or expressions can be used to define media envelope 130 and/or otherwise filter or select set of media sources 110 for delivery to mobile device 102.

In 1110, service provider can make a determination whether compass orientation data is embedded in location-enhanced uniform resource locator (URL) 124. If the determination of 1110 is no, processing can proceed to 1114. If the determination of 1110 is yes, processing can proceed to 1112, where service provider 120 can identify video and/or other sources within set of media sources 110 within a frustum, conical section, and/or media envelope 130 for the mobile device 102. In one or more aspects, and illustratively, a frustum, conical section, and/or media envelope 130 can be defined by a calculation, such as, merely illustratively, $(x^2+y^2)*(\cos(\theta))^2-z2(\sin(\theta))^2,=1$, where: θ represents an angular divergence or spread from mobile device 102 along an axis defined by the compass direction in which a video or other sensor of mobile device 102 is pointed, and x, y, and z represent latitude, longitude, and elevation components of a position of mobile device 102, thereby defining a frustum, conical section, or other sectional media envelope emanating from mobile device 102. Other functions, calculations, or expressions can be used to define a frustum-type media envelope 130 and/or otherwise filter or select set of media sources 110 for delivery to mobile device 102.

In 1114, service provider 120 can make a determination whether user preference data is embedded in location-enhanced uniform resource locator (URL) 124 or is otherwise provided to filter media content feeds to mobile device 102. If the determination of 1114 is no, processing can proceed to 1118. If the determination of 1114 is yes, processing can proceed to 1116, where any operative preferences and/or other filters can be applied to set of media sources 110 to select sources for delivery to mobile device 102. In one or more aspects, for instance, service provider 120 or logic hosted in other resources can select video feeds tagged as a "celebrity sighting," or can select music or concert sources tagged as "jazz," or can apply other preferences or settings.

In 1118, service provider 120 can send a text, thumbnail, video clip, and/or other sample or preview of the available or selected media 104 within media envelope 120 or otherwise to mobile device 102 for display on the user interface of that device. In 1120, a completed set of media sources in set of media sources 110 within media envelope 130 or otherwise can be selected and finalized to transmit to the requesting mobile device 102. In 1122, service provider 120 can transmit media 104 from the identified set of media sources within media envelope 130 or otherwise to mobile device 102. In 1124, service provider 120 can generate an updated media envelope 130 and/or an updated set of selected media sources for delivery based on an updated set of attributes 106 for mobile device 102 and/or updated location attributes 106 for set of media sources 110, as appropriate, for instance using a persistent connection such as Web 2.0™, Ajax™, Java™ Script, uniform resource locators (URLs), and/or other protocols, formats, or channels. In 1126, service provider 120 can store a record of the media 104 served to mobile device 102, as well as user selections, preferences, location history of mobile device 102, and/or other media transaction data, as appropriate. In 1128, processing can repeat, return to a prior processing point, jump to a further processing point, or end.

The foregoing description is illustrative, and variations in configuration and implementation may occur to persons skilled in the art. For instance, the various illustrative logics, logical blocks, modules, devices, and circuits, including personal computers, cellular telephones, media playback devices, and servers, described in connection with the implementations disclosed herein may be implemented or performed with or using a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In one or more exemplary implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal For further example, while implementations have been described where mobile device 102 communicates with a single service provider 120 to register and receive selective media content feeds, In one or more aspects, mobile device 102 can communicate with multiple servers or other resources to receive media 104 and associated information. For still further example, while implementations have been described where device location and other data is encoded within a location-enhanced uniform resource locator (URL) 124, in one or more aspects other encodings or interfaces, such as sockets, ports, application programming interfaces (APIs), can communicate location-related attributes and other data. Other resources described, as singular or integrated can in embodiments be plural or distributed, and resources described as multiple or distributed can in embodiments be combined. The scope of the present teachings is accordingly intended to be limited only by the following claims.

What is claimed is:

1. A method of identifying content for delivery to a mobile device, comprising:
    receiving, at a server, a message that includes a set of attributes associated with the mobile device, wherein the set of attributes comprise at least one of position, speed, and direction data for the mobile device or compass orientation data for a sensor of the mobile device;

identifying, by the server, a set of media sources available in a network; and identifying, by the server, content available from at least a subset of the set of media sources for delivery to the mobile device based on access criteria comprising at least one of:
- (a) the position, speed, and direction data for the mobile device, wherein the mobile device generates the position, speed, and direction data, or
- (b) the compass orientation data for the sensor of the mobile device.

2. The method of claim 1, wherein the set of media sources comprises a set of video feed sources.

3. The method of claim 1, wherein the access criteria further comprise position, speed, and direction data for the set of media sources.

4. The method of claim 3, wherein the identifying comprises determining that the mobile device is projected to intersect with the subset of the set of media sources associated with the identified content based on the position, speed, and direction data for the mobile device and the position, speed, and direction data for the set of media sources.

5. The method of claim 1, wherein the identifying comprises determining that the subset of the set of media sources associated with the identified content are located within a projected frustum determined by the compass orientation data for the sensor of the mobile device.

6. The method of claim 1, wherein the access criteria further comprise at least one of a set of static data associated with the set of media sources, a set of static data associated with the mobile device, or a set of user preferences.

7. The method of claim 6, wherein the set of user preferences comprises at least one of a set of content type criteria, a set of cost criteria, a set of social networking criteria, or a set of content keyword criteria.

8. The method of claim 1, wherein the access criteria comprise the position, speed, and direction data for the mobile device, and the identifying comprises identifying differing subsets of the set of media sources as a function of the position, speed, and direction of the mobile device.

9. The method of claim 8, wherein the identifying differing subsets comprises selecting media sources within a varying envelope whose length along the direction of the mobile device increases with increases in the speed of the mobile device.

10. The method of claim 8, wherein the identifying differing subsets comprises defaulting to a predetermined subset of the media sources when the speed of the mobile device exceeds a predetermined threshold.

11. A media delivery system, comprising:
an interface to a set of media sources in a network; and
a server, communicating with the set of media sources via the interface, the server being configured to receive a message that includes a set of attributes associated with a mobile device, wherein the set of attributes comprise at least one of position, speed, and direction data for the mobile device or compass orientation data for a sensor of the mobile device, and the server being further configured to identify content available from at least a subset of the set of media sources for delivery to the mobile device based on access criteria comprising at least one of:
- (a) the position, speed, and direction data for the mobile device, wherein the mobile device generates the position, speed, and direction data, or
- (b) the compass orientation data for the sensor of the mobile device.

12. The system of claim 11, wherein the set of media sources comprises a set of video feed sources.

13. The system of claim 11, wherein the access criteria further comprise position, speed, and direction data for the set of media sources, and wherein the identifying comprises determining that the mobile device is projected to intersect with the subset of the set of media sources associated with the identified content based on the position, speed, and direction data for the mobile device and the position, speed, and direction data for the set of media sources.

14. The system of claim 11, wherein the identifying comprises determining that the subset of the set of media sources associated with the identified content are located within a projected frustum determined by the compass orientation data for the sensor of the mobile device.

15. The system of claim 11, wherein the access criteria further comprise at least one of a set of static data associated with the set of media sources, a set of static data associated with the mobile device, or a set of user preferences including at least one of a set of content type criteria, a set of cost criteria, a set of social networking criteria, or a set of content keyword criteria.

16. The system of claim 11, wherein the access criteria comprise the position, speed, and direction data for the mobile device, and the identifying comprises identifying differing subsets of the set of media sources as a function of the position, speed, and direction of the mobile device.

17. A media delivery system, comprising:
means for interfacing to a set of media sources in a network; and
means for serving data, communicating with the set of media sources via the means for interfacing, the means for serving data being configured to receive a message that includes a set of attributes associated with a mobile device, wherein the set of attributes comprise at least one of position, speed, and direction data for the mobile device or compass orientation data for a sensor of the mobile device, and the means for serving data being further configured to identify content available from at least a subset of the set of media sources for delivery to the mobile device based on access criteria comprising at least one of:
- (a) the position, speed, and direction data for the mobile device, wherein the mobile device generates the position, speed, and direction data, or
- (b) the compass orientation data for the sensor of the mobile device.

18. The system of claim 17, wherein the set of media sources comprises a set of video feed sources.

19. The system of claim 17, wherein the access criteria further comprise position, speed, and direction data for the set of media sources, and wherein the identifying comprises determining that the mobile device is projected to intersect with the subset of the set of media sources associated with the identified content based on the position, speed, and direction data for the mobile device and the position, speed, and direction data for the set of media sources.

20. The system of claim 17, wherein the identifying comprises determining that the subset of the set of media sources associated with the identified content are located within a projected frustum determined by the compass orientation data for the sensor of the mobile device.

21. The system of claim 17, wherein the access criteria further comprise at least one of a set of static data associated with the set of media sources, a set of static data associated with the mobile device, or a set of user preferences including at least one of a set of content type criteria, a set of cost criteria, a set of social networking criteria, or a set of content keyword criteria.

22. The system of claim 17, wherein the access criteria comprise the position, speed, and direction data for the mobile device, and the identifying comprises identifying differing subsets of the set of media sources as a function of the position, speed, and direction of the mobile device.

23. A computer program product, comprising:
a non-transitory computer readable media having one or more instructions stored thereon, wherein the one or more instructions, when executed on a computer, cause the computer to:
receive a message that includes a set of attributes associated with a mobile device, wherein the set of attributes comprise at least one of position, speed, and direction data for the mobile device or compass orientation data for a sensor of the mobile device;
identify a set of media sources available in a network; and
identify content available from at least a subset of the set of media sources for delivery to a mobile device based on access criteria comprising at least one of:
(a) the position, speed, and direction data for the mobile device, wherein the mobile device generates the position, speed, and direction data, or
(b) the compass orientation data for the sensor of the mobile device.

24. The computer program product of claim 23, wherein the set of media sources comprises a set of video feed sources.

25. The computer program product of claim 23, wherein the access criteria further comprise position, speed, and direction data for the set of media sources, and wherein the identifying comprises determining that the mobile device is projected to intersect with the subset of the set of media sources associated with the identified content based on the position, speed, and direction data for the mobile device and the position, speed, and direction data for the set of media sources.

26. The computer program product of claim 23, wherein the identifying comprises determining that the subset of the set of media sources associated with the identified content are located within a projected frustum determined by the compass orientation data for the sensor of the mobile device.

27. The computer program product of claim 23, wherein the access criteria further comprise at least one of a set of static data associated with the set of media sources, a set of static data associated with the mobile device, or a set of user preferences including at least one of a set of content type criteria, a set of cost criteria, a set of social networking criteria, or a set of content keyword criteria.

28. The computer program product of claim 23, wherein the access criteria comprise the position, speed, and direction data for the mobile device, and the identifying comprises identifying differing subsets of the set of media sources as a function of the position, speed, and direction of the mobile device.

29. A method of receiving content in a mobile device, comprising:
generating, on the mobile device, a set of attributes that comprise at least one of:
(a) position, speed, and direction data for the mobile device, or
(b) compass orientation data for a sensor of the mobile device; and
sending, by the mobile device, a message that includes the set of attributes to a network to initiate access to content available from at least a subset of a set of media sources available in the network for delivery to the mobile device based on access criteria including at least one of the position, speed, and direction data for the mobile device or the compass orientation data for the sensor of the mobile device.

30. The method of claim 29, wherein the set of media sources comprises a set of video feed sources.

31. The method of claim 29, wherein the access criteria further comprise position, speed, and direction data for the set of media sources, and wherein the subset of the set of media sources is identified by a projected intersection with the mobile device based on the position, speed, and direction data for the mobile device and the position, speed, and direction data for the set of media sources.

32. The method of claim 29, wherein the subset of the set of media sources is identified by determining at least a subset of the set of media sources which are located within a projected frustum determined by the compass orientation data for the sensor of the mobile device.

33. The method of claim 29, wherein the access criteria further comprise at least one of a set of static data associated with the set of media sources, a set of static data associated with the mobile device, or a set of user preferences including at least one of a set of content type criteria, a set of cost criteria, a set of social networking criteria, or a set of content keyword criteria.

34. The method of claim 29, wherein the access criteria comprise the position, speed, and direction data for the mobile device, and the subset of the set of media sources comprises differing subsets of the set of media sources that are identified as a function of the position, speed, and direction of the mobile device.

35. A mobile device, comprising:
a wireless interface to at least one content server via a network; and
a processor, the processor communicating with the at least one content server via the wireless interface, the processor being configured to:
generate, on the mobile device, a set of attributes that comprise at least one of:
(a) position, speed, and direction data for the mobile device, or
(b) compass orientation data for a sensor of the mobile device, and
send a message that includes the set of attributes to the at least one content server to initiate access to content available from at least a subset of a set of media sources available in the network for delivery to the mobile device based on access criteria including at least one of the position, speed, and direction data for the mobile device or the compass orientation data for the sensor of the mobile device.

36. The device of claim 35, wherein the set of media sources comprises a set of video feed sources.

37. The device of claim 35, wherein the access criteria further comprise position, speed, and direction data for the set of media sources, and wherein the subset of the set of media sources is identified by a projected intersection with the mobile device based on the position, speed, and direction data for the mobile device and the position, speed, and direction data for the set of media sources.

38. The device of claim 35, wherein the subset of the set of media sources is identified by determining at least a subset of the set of media sources which are located within a projected frustum determined by the compass orientation data for the sensor of the mobile device.

39. The device of claim 35, wherein the access criteria further comprise at least one of a set of static data associated with the set of media sources, a set of static data associated with the mobile device, or a set of user preferences including at least one of a set of content type criteria, a set of cost criteria, a set of social networking criteria, or a set of content keyword criteria.

40. The device of claim 35, wherein the access criteria comprise the position, speed, and direction data for the mobile device, and the subset of the set of media sources comprises differing subsets of the set of media sources that are identified as a function of the position, speed, and direction of the mobile device.

41. A mobile device, comprising:
means for providing a wireless interface to at least one content server via a network; and
means for processing data, the means for processing data communicating with the at least one content server via the means for providing the wireless interface, the means for processing being configured to:
generate, on the mobile device, a set of attributes that comprise at least one of:
(a) position, speed, and direction data for the mobile device, or
(b) compass orientation data for a sensor of the mobile device, and
send a message that includes the set of attributes to the at least one content server to initiate access to content available from at least a subset of a set of media sources available in the network for delivery to the mobile device based on access criteria including at least one of the position, speed, and direction data for the mobile device or the compass orientation data for the sensor of the mobile device.

42. The device of claim 41, wherein the set of media sources comprises a set of video feed sources.

43. The device of claim 41, wherein the access criteria further comprise position, speed, and direction data for the set of media sources, and wherein the subset of the set of media sources is identified by a projected intersection with the mobile device based on the position, speed, and direction data for the mobile device and the position, speed, and direction data for the set of media sources.

44. The device of claim 41, wherein the subset of the set of media sources is identified by determining at least a subset of the set of media sources which are located within a projected frustum determined by the compass orientation data for the sensor of the mobile device.

45. The device of claim 41, wherein the access criteria further comprise at least one of a set of static data associated with the set of media sources, a set of static data associated with the mobile device, or a set of user preferences including at least one of a set of content type criteria, a set of cost criteria, a set of social networking criteria, or a set of content keyword criteria.

46. The device of claim 41, wherein the access criteria comprise the position, speed, and direction data for the mobile device, and the subset of the set of media sources comprises differing subsets of the set of media sources that are identified as a function of the position, speed, and direction of the mobile device.

47. A computer program product, comprising:
a non-transitory computer readable media having one or more instructions stored thereon, wherein the one or more instructions, when executed on a mobile device, cause the mobile device to:
generate a set of attributes that comprise at least one of:
(a) position, speed, and direction data for the mobile device, or
(b) compass orientation data for a sensor of the mobile device; and
send a message that includes the set of attributes to a network to initiate access to content available from at least a subset of a set of media sources available in the network for delivery to the mobile device based on access criteria including at least one of the position, speed, and direction data for the mobile device or the compass orientation data for the sensor of the mobile device.

48. The computer program product of claim 47, wherein the set of media sources comprises a set of video feed sources.

49. The computer program product of claim 47, wherein the access criteria further comprise position, speed, and direction data for the set of media sources, and wherein the one or more instructions, when executed on the mobile device, further cause the mobile device to identify the subset of the set of media sources by a projected intersection with the mobile device based on the position, speed, and direction data for the mobile device and the position, speed, and direction data for the set of media sources.

50. The computer program product of claim 47, wherein the one or more instructions, when executed on the mobile device, further cause the mobile device to identify the subset of the set of media sources by determining at least a subset of the set of media sources which are located within a projected frustum determined by the compass orientation data for the sensor of the mobile device.

51. The computer program product of claim 47, wherein the access criteria further comprise at least one of a set of static data associated with the set of media sources, a set of static data associated with the mobile device, or a set of user preferences including at least one of a set of content type criteria, a set of cost criteria, a set of social networking criteria, or a set of content keyword criteria.

52. The computer program product of claim 47, wherein the access criteria comprise the position, speed, and direction data for the mobile device, and the one or more instructions, when executed on the mobile device, further cause the mobile to identify the subset of the set of media sources by identifying differing subsets of the set of media sources as a function of the position, speed, and direction of the mobile device.

53. A method of capturing media content via a media source device, comprising:
capturing, by the media source device, at least one type of media content;
capturing, by the media source device, content metadata for the at least one type of media content, the content metadata comprising at least one of:
(a) position, speed, and direction data for the media source device, wherein the media source device generates the position, speed, and direction data based on sensor data captured from one or more sensors of the media source device, or
(b) compass orientation data captured from the one or more sensors of the media source device; and
uploading, by the media source device, the at least one type of media content and the content metadata captured for the at least one type of media content to at least one content server for delivery to a mobile device based at least on the content metadata.

54. A media source device, the media source device comprising:
- an interface to at least one content server via a network; and
- a processor, the processor communicating with the at least one content server via the interface, the processor being configured to:
  - capture at least one type of media content;
  - capture content metadata for the at least one type of media content, the content metadata comprising at least one of:
    - (a) position, speed, and direction data for the media source device,
    - wherein the media source device generates the position, speed, and direction data based on sensor data captured from one or more sensors of the media source device, or
    - (b) compass orientation data captured from the one or more sensors of the media source device; and
  - upload the at least one type of media content and the content metadata captured for the at least one type of media content to the at least one content server for delivery to a mobile device based at least on the content metadata.

55. A media source device, comprising:
- means for providing an interface to at least one content server via a network; and
- means for processing data, the means for processing data communicating with the at least one content server via the means for providing the interface, the means for processing being configured to:
  - capture at least one type of media content;
  - capture content metadata for the at least one type of media content, the content metadata comprising at least one of:
    - (a) position, speed, and direction data for the media source device, wherein the media source device generates the position, speed, and direction data based on sensor data captured from one or more sensors of the media source device, or
    - (b) compass orientation data captured from the one or more sensors of the media source device; and
  - upload the at least one type of media content and the content metadata captured for the at least one type of media content to the at least one content server for delivery to a mobile device based at least on the content metadata.

56. A non-transitory computer readable media having one or more instructions stored thereon, wherein the one or more instructions, when executed on a media source device, cause the media source device to:
- capture at least one type of media content;
- capture content metadata for the at least one type of media content, the content metadata comprising at least one of:
  - (a) position, speed, and direction data for the media source device, wherein the media source device generates the position, speed, and direction data based on sensor data captured from one or more sensors of the media source device, or
  - (b) compass orientation data captured from the one or more sensors of the media source device; and
- upload the at least one type of media content and the content metadata captured for the at least one type of media content to at least one content server for delivery to a mobile device based at least on the content metadata.

* * * * *